Aug. 19, 1958 R. A. NOLAND ET AL 2,848,352
FUEL ELEMENTS AND METHOD OF MAKING
Filed Dec. 7, 1956
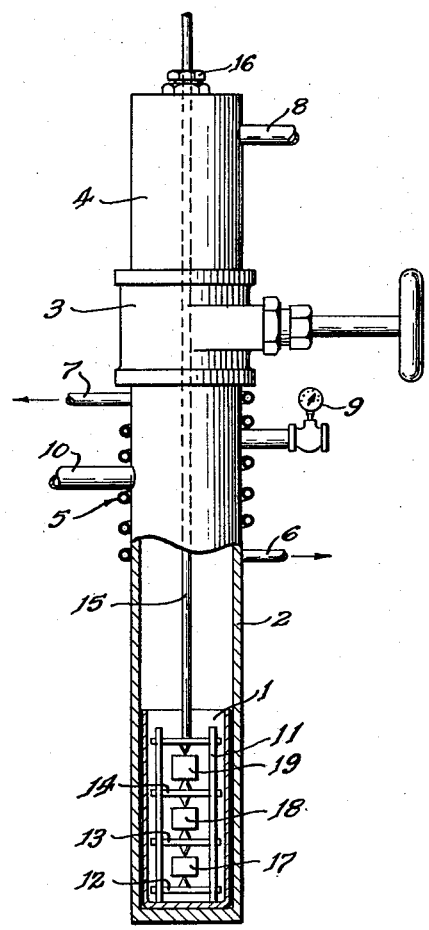
INVENTORS
Robert A. Noland
Christopher Marzano
BY
Roland A. Anderson
Attorney

United States Patent Office 2,848,352
Patented Aug. 19, 1958

2,848,352

FUEL ELEMENTS AND METHOD OF MAKING

Robert A. Noland, Chicago, and Christopher Marzano, North Riverside, Ill., assignors to the United States of America as represented by the United States Atomic Energy Commission Application December 7, 1956, Serial No. 627,085

8 Claims. (Cl. 117—65)

This invention deals with a process of surface-impregnating bodies of uranium metal with silicon and with the products obtained thereby.

Uranium metal is frequently used as the fuel material of nuclear reactors, such as are described, for instance, in U. S. Patent No. 2,708,656, granted to Fermi et al., on May 17, 1955. The uranium is mostly used in the form of rods, slugs, or other preshaped bodies. Since uranium is very reactive and easily oxidizes, it has to be "canned" in a metal jacket of, for instance, aluminum. However, if the cans have leaks, cooling water still will contact the uranium and react with it. Furthermore, when uranium fuel elements are exposed to high temperatures, the crystals become coarse, and when they are exposed to fluctuations such as occur in neutronic reactors, for instance to fluctuations between about 50° and 550° C., the oriented uranium grains of the bodies grow anisotropically and roughen on the surfaces. These are all very undesirable features, because the growth or distortion causes jamming of the uranium fuel elements which in turn makes their removal very difficult and the operation of the reactor hazardous.

It has been tried to coat the uranium with a comparatively non-corrosive uranium-silicon alloy or to form this alloy on the fuel elements. However, the customary processes for siliconizing metal surfaces were found not to be operative for uranium metal. Even when a high vacuum was applied, a film formed on the surface of the uranium which prevented the deposition of a satisfactory silicon layer.

It is an object of this invention to provide a process for impregnating bodies of metallic uranium with silicon in which all the above-listed disadvantages have been overcome.

It is an object of this invention to provide uranium fuel elements which are characterized by a high degree of resistance to corrosion.

It is another object of this invention to provide a process for making uranium fuel elements which have a fine grain size and in which the grains are randomly distributed and remain so even when exposed to elevated temperature.

It is also an object of this invention to provide fuel elements of metallic uranium which, when exposed to elevated temperatures and to temperature fluctuations, show a reduced amount of growth and distortion.

It is still another object of this invention to produce fuel elements of metallic uranium which have a siliconized surface layer that is uniform and well-adherent.

It is still another object of this invention to provide a novel process of incorporating silicon into the surface of uranium articles which can be carried out at relatively low temperatures.

It is finally also an object of this invention to provide a process of impregnating fuel elements of metallic uranium with silicon during which no, or a negligible amount only of, uranium oxidation takes place.

These and other objects are accomplished by adding, or admixing, silicon metal to alkali metal selected from the group consisting of sodium, potassium and sodium-potassium alloy, immersing the uranium body to be treated into the mixture obtained, and heating the silicon-containing alkali metal to a temperature of between 425° and 600° C. whereby some silicon is dissolved and transferred from the solution to the surface of said uranium body where a uranium-silicon compound is formed; a new amount of silicon is continually dissolved as the silicon is deposited from the solution. The process of this invention is also operable for the siliconization of thorium and molybdenum metals. The alkali metal is inert to uranium, thorium or molybdenum and to the metals of which the equipment for carrying out the process of this invention is usually made.

The fuel elements are preferably subjected to the process of this invention in a prefabricated form, that is, after they have been machined to size. Cylinders having a diameter of ⅜ of an inch and a length of 1 inch were mostly used for the studies that led to the process of this invention. The prefabricated uranium bodies were then advantageously surface-cleaned by methods known to those skilled in the art, e. g., by electropolishing. An aqueous solution containing about 45% of concentrated sulfuric acid and 9% of glycerin, for instance, was found satisfactory for this purpose.

While the silicon content of the mixture with the alkali metal may vary widely, a quantity of from 0.1 to 4 grams of silicon per 100 cc. of the alkali metal was preferred.

Any equipment known to those skilled in the art can be used for the process of this invention. One preferred apparatus, which was used for the experiments herein described, is diagrammatically illustrated in the attached drawing. In this drawing the reference numeral 1 designates a metal cylinder, preferably made of zirconium, which contains the alkali metal-silicon metal mixture (not shown). The alkali metal preferably is the sodium-potassium eutectic which melts at −12° C. The cylinder is inserted in a stainless steel tube 2 which is capped by a gate valve 3. Above the valve 3 there is arranged a loading chamber 4. The lower two-thirds of the tube 2 is adapted to be heated externally by means not shown, while the top of the tube is cooled by water which flows through copper tubing 5 provided with a water inlet 6 and a water outlet 7. A gas pipe 8 arranged at the side of the loading chamber can be connected with means for evacuating the system or with a source of argon or other inert gas (not shown). Likewise, an outlet 10 is arranged in tube 2 for evacuation of the part of the apparatus below the gate valve and for introduction of the alkali metal. The pressure in the system can be determined with a pressure gauge 9. A rack 11 having a plurality of trays 12, 13 and 14 and a long rod 15 fits into cylinder 1; the rod 15 extends through the loading chamber 4 through a neoprene packing gland 16. Uranium slugs 17, 18 and 19, respectively, are shown on trays 12, 13 and 14.

While most parts of the apparatus are preferably made of stainless steel, the parts having contact with the sodium-potassium-silicon mixture are preferably made of zirconium metal which does not react with the silicon or the alkali metal at the temperatures used in the process; the loss of silicon is thus reduced to a minimum.

In carrying out the process of this invention in the apparatus just described, the cylinder 1 is inserted into the tube 2; the gate valve 3 is closed, and argon gas is introduced through pipe 10 after evacuation of the tube; the alkali metal is then conveyed through inlet 10 into the cylinder 1. Silicon metal, preferably the exact quantity desired to be incorporated into the uranium body or bodies, is then placed on one or several trays of rack 11. The rack is then inserted into the loading chamber 4, and the latter is then evacuated and subsequently flushed with argon through pipe 8. After this the valve 3 is opened and the tray holding the silicon is lowered into the alkali metal contained in the cylinder 1; the lower part of the tube is then heated for a time sufficient to dissolve as much of the immersed silicon as the alkali metal takes up, preferably for from 2 to 4 hours. During this step the upper part is cooled by water running through coil 5. After this, the tray is emptied by dropping any residual silicon into cylinder 1 and pulled up again through the opened gate valve into loading chamber 4; the gate valve is then closed again, and the tube is filled with argon gas. Thereafter the uranium bodies to be coated are placed on the trays and preferably fastened thereto by clamps; gate valve 3 is opened, and the trays are introduced into cylinder 1 so that they are immersed in the alkali metal-silicon mixture and left therein for the time desired; immersion for several hours, usually overnight, was found adequate.

While the temperature of the alkali metal-silicon mixture may range between 400° and 800° C., a temperature of between 425° and 600° C. was preferred. The best results were obtained at between 475° and 485° C. After the desired immersion time the uranium bodies were withdrawn from the apparatus and sprayed, while still on the rack, with cold water in order to remove any adhering alkali metal.

The weight gain of the uranium bodies was a clear indication of the amount of silicon taken up. This increase was never found to be higher than the silicon added to the sodium-potassium alloy; when oxidation took place during the process, a loss of weight was ascertained after water-spraying which was due to poor adhering and spalling of the oxidized surface layer.

The bodies coated by the process of this invention were examined by X-ray diffraction; in most cases the surface layers formed were found to consist mainly of the compound $USi_2$.

The use of temperatures higher than 600° C. or of immersion times for too long a time was not advisable because then the layers formed were too thick and spalled when exposed to high temperatures. When thicker layers of the uranium-silicon alloy were desired, they were formed in installments; a thin layer, preferably about 1 mil thick, was prepared first under the optimum conditions set forth above, and the impregnated uranium was then heated to about 950° to 1000° C. under vacuum whereby the silicon diffused from the surface layer into the inner parts of the uranium body. By repetition of the impregnation-diffusion cycle for a predetermined number of times a satisfactory uranium-silicon layer which does not spall at elevated temperatures can be produced in any thickness desired.

Uranium bodies treated by the process of this invention were rolled and annealed at alpha-temperatures (below 660° C.) and then microscopically examined. The bodies were found to have a large-grained zone in the center but a very fine-grained layer at and near the periphery of the uranium-silicon alloy.

Although the part of the alkali metal in the process is not known with certainty, it is believed that it functions as an inert carrier by dissolving a small amount of silicon; the dissolved silicon is then taken up by the uranium and the equilibrium is continuously reestablished by the dissolution of new amounts of silicon. This continues until the uranium bodies are removed or until all silicon originally present in the alkali metal has been deposited. Apart from this function, the alkali metal also protects the uranium from an oxidizing atmosphere.

In the following, an example is given for illustrative purposes only without the intention to have the invention limited to the details given therein.

*Example*

Two samples, I and II, were cut from the same uranium rod; both samples had the same dimensions. Sample I was immersed in a silicon-containing sodium-potassium eutectic at a temperature of about 475° C. in the manner described above. The total pickup of the silicon by the uranium was determined to be 55 mg. Sample I was then withdrawn from the sodium-potassium alloy, and Sample II was immersed under the same conditions but without any further addition of silicon. Sample II did not increase in weight. This shows that all silicon present had been taken up by Sample I.

Both samples were then subjected to the same heat treatment consisting of heating for 48 hours at 975° C. followed by water-quenching, rolling at 300° C. until a total reduction in area of 50% had been obtained, and beta-heat treatment at 735° C. for 30 minutes and subsequent water-quenching. Test pieces about 1 inch long were than cut from each sample and subjected to so-called thermocycling; each cycle consisted of holding the sample for 2 minutes at 50° C. and then for 5 minutes at 550° C. with a 5-second transfer period between each temperature change. Each sample was exposed to 500 such cycles. The table below shows the dimensions of each sample before and after thermocycling.

| Sample No. | Length, In. Original | Length, In. After Cycling | Change, Inches | Diameter, In. Original | Diameter, In. After Cycling | Change, Inches |
|---|---|---|---|---|---|---|
| I | 0.951 | 0.965 | +0.014 | 0.2535 | 0.255 | +0.0015 |
| II | 0.969 | 0.996 | +0.027 | 0.2505 | 0.260 | +0.0095 |

This table shows that the siliconized Sample I was considerably more stable than Sample II. Metallographic examination of the samples cut from the heat-treated rods I and II, before thermocycling, also showed that in the edge layer of silicon penetration the grain size was considerably finer than in the center, while no such distinction as to grain size could be detected in Sample II.

It will be understood that this invention is not to be limited to the details given herein and that it may be modified within the scope of the appended claims.

What is claimed is:

1. A process of impregnating articles of metallic uranium with silicon, comprising immersing said articles in a mixture of silicon metal and alkali metal selected from the group consisting of sodium, potassium and sodium-potassium alloy; heating said mixture to a temperature of between 425° and 600° C. whereby silicon is taken up by said alkali metal and thence is transferred to said uranium articles and a uranium-silicon compound is formed thereon, and removing said articles from said mixture.

2. The process of claim 1 whereby any adhering alloy is removed from said finished articles from the surface by spraying with water.

3. The process of claim 1 in which the alkali metal is a sodium-potassium alloy.

4. The process of claim 3 in which the sodium-potassium alloy is the eutectic.

5. The process of claim 1 wherein the temperature ranges between about 475° and 485° C.

6. The process of impregnating articles of metallic uranium with silicon, comprising immersing said articles in a mixture of sodium-potassium alloy and silicon metal; heating said mixture to a temperature of between 425° and 600° C. whereby silicon is taken up by said alkali metal and thence is transferred to said uranium articles and a uranium-silicon compound is formed thereon; removing said articles from said mixture; heating the siliconized articles to a temperature of between about 950° and 1000° C. whereby the silicon taken up by said articles diffuses into the interior of said articles; and repeating said cycle of impregnating steps and diffusion-heating until a siliconized layer of the desired thickness has been obtained.

7. The process of claim 1 in which the silicon content in the mixture ranges from 0.1 to 4 grams per 100 cc. of alkali metal.

8. The process of claim 6 in which the silicon content in the mixture ranges from 0.1 to 4 grams per 100 cc. of alkali metal.

References Cited in the file of this patent

UNITED STATES PATENTS

| | | |
|---|---|---|
| 2,725,316 | Fuller | Nov. 29, 1955 |
| 2,731,341 | Kaufmann | Jan. 17, 1956 |
| 2,788,289 | Deuble | Apr. 9, 1957 |